No. 647,444. Patented Apr. 10, 1900.
W. W. FINTON.
STARCHING MACHINE.
(Application filed Dec. 22, 1898.)
(No Model.)
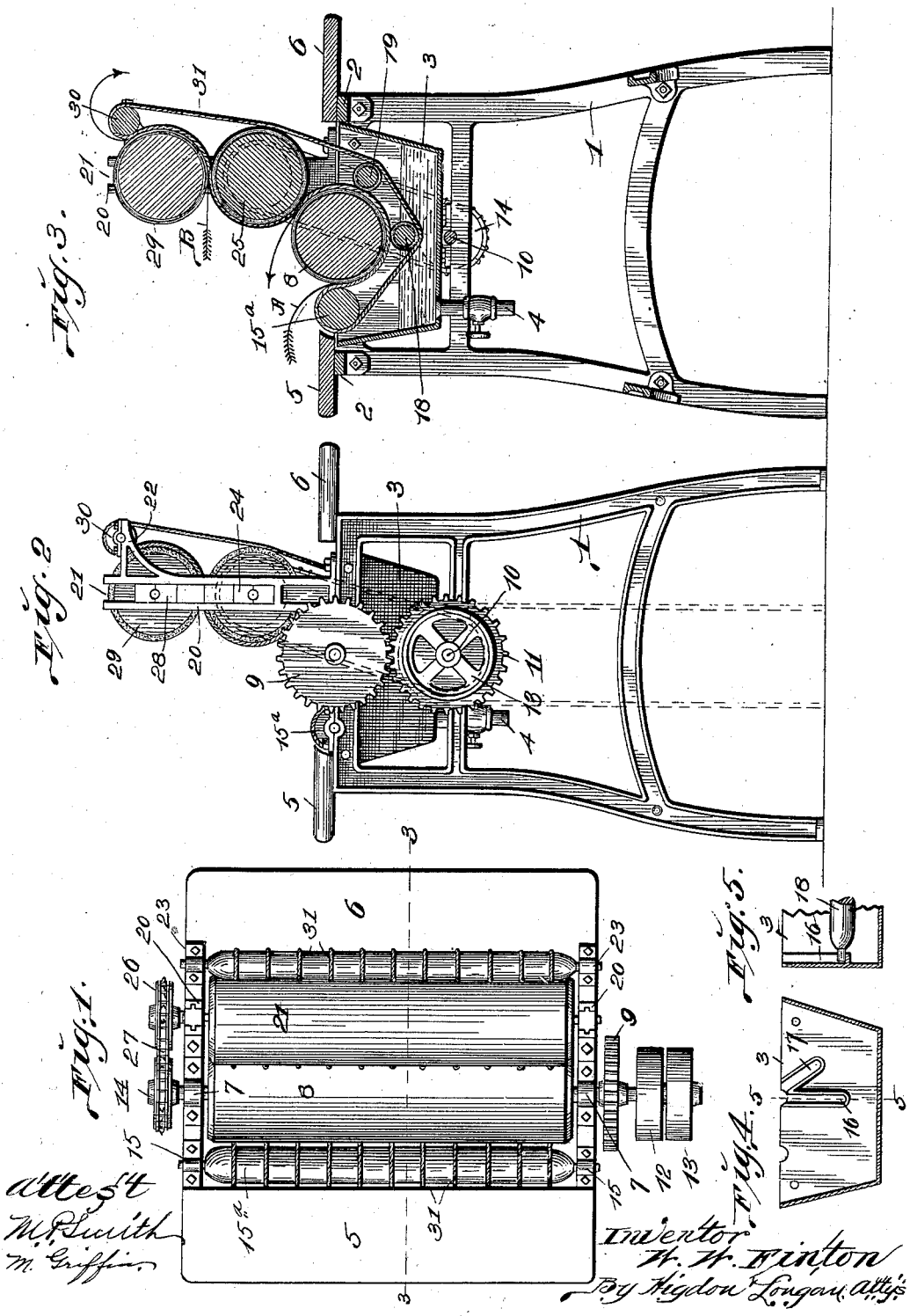

UNITED STATES PATENT OFFICE.

WILLIAM W. FINTON, OF FORT DODGE, IOWA, ASSIGNOR TO A. CRAIG, OF SAME PLACE.

STARCHING-MACHINE.

SPECIFICATION forming part of Letters Patent No. 647,444, dated April 10, 1900.

Application filed December 22, 1898. Serial No. 700,086. (No model.)

*To all whom it may concern:*

Be it known that I, WILLIAM W. FINTON, of the city of Fort Dodge, Webster county, State of Iowa, have invented certain new and useful Improvements in Starching-Machines, of which the following is a full, clear, and exact description, reference being had to the accompanying drawings, forming a part hereof.

My invention relates to starching-machines; and it consists of the novel construction, combination, and arrangement of parts hereinafter shown, described, and claimed.

Figure 1 is a plan view of my improved starching-machine. Fig. 2 is a side elevation thereof. Fig. 3 is a vertical sectional view taken approximately on the line 3 3 of Fig. 1. Fig. 4 is a vertical sectional view of the starching-pan made use of in my improved machine. Fig. 5 is a vertical sectional view taken approximately on the line 5 5 of Fig. 4.

In the construction of my improved starching-machine I make use of a pair of cast standards or side frames 1, the upper ends of which are framed together by the cross-bars 2. Removably located in the upper end of this frame so formed is a starching-pan 3, which is provided with a suitable outlet 4. A front table 5 is arranged upon the forward one of the cross-bars 2, immediately above the forward edge of the starching-pan 3, and a rear table 6 is arranged upon the rear cross-bar immediately above the rear end of the starching-pan 3.

Arranged on top of the frames 1 and in the centers thereof are the alined bearings 7, in which is rotatably arranged the trunnions or bearings of a roller 8, the surface of which roller is provided with a layer or layers of elastic absorbent material, such as felt. Upon one of the trunnions or bearings of this roller outside the frame of the machine is rigidly located a gear-wheel 9.

Extending transversely through the frame of the machine and journaled in suitable bearings therein immediately below this roller 8 and the starching-pan 3 is a shaft 10, upon one end of which outside the frame is rigidly fixed a gear-wheel 11, that meshes with the gear-wheel 9, and outside said gear-wheel 11, upon said shaft 10, are located tight and loose pulleys 12 and 13, the same being adapted to receive a driven belt, (shown in dotted lines in Fig. 2,) which belt furnishes the motive power for my improved starching-machine. Located on the end of this shaft 10, opposite the end on which these pulleys are located, is a sprocket-wheel 14. Journaled in suitable bearings 15, that are located upon the frame in front of the bearings 7, are the trunnions of a roller $15^a$, which roller is much smaller in diameter than is the roller 8, and said roller $15^a$ occupies the space between said roller 8 and the front edge of the starching-pan 3.

Fixed upon the inside faces of the ends of the starching-pan 3 are the U-shaped journal-bearings 16 and 17, in which bearings 16 are journaled the trunnions of a small roller 18, the same operating against the under side of and in direct alinement with the large roller 8, and said roller 18 being also provided with an elastic absorbent surface.

Journaled in the bearings 17 are the trunnions of a roller 19, in every way similar to the roller 18 just described, said roller 19 bearing against the lower and rear side of the roller 8.

Fixed to and extending upwardly from the top side of the frame of the machine, at a point between the bearings 7 and the rear table 6, are the supporting-frames 20, the same being provided with vertical slots 21, and said supporting-frames are provided at their upper ends with rearwardly-extending brackets 22, that support the horizontally-alined journal-bearings 23. Arranged in the lower ends of the slots 20 are the journal-boxes 24, in which are rotatably arranged the trunnions of a roller 25, the same being identical in construction and approximately of the same size as is the roller 8, and upon the trunnion that extends through one of these journal-boxes 24, on the side of the machine on which the sprocket-wheel 14 is located, is located a sprocket-wheel 26, and a sprocket-chain 27 connects said sprocket-wheel 26 with the sprocket-wheel 14. The roller 25 bears directly upon the roller 8, and journaled in boxes 28, located in the upper ends of the slots 21, are the trunnions of a roller 29, in every way similar to the rollers 25 and 8, previously described, said roller 29 being provided with the elastic absorbent surface and bearing directly upon the roller 25. A small roller 30 has its trunnions journaled in the horizontally-alined bearings 23, carried by the brackets 22, and said roller 30 bears upon the upper and rear side of the roller 29. A plurality of endless cords 31 pass around the roller 15ª, between said roller 15ª and the roller 8, around the lower and rear side of said roller 8, between said roller 8 and the small rollers 18 and 19, between said roller 8 and the roller 25, around the front of said roller 25, between said roller 25 and the roller 29, around the rear side of said roller 29, over the roller 30, downwardly behind the roller 25, and beneath the rollers 19 and 18 to the roller 15ª.

Before using my improved starching-machine it is necessary that the starching-pan 3 be partially filled with liquid starch. The operator throws the belt from the loose pulley 13 onto the tight pulley 12, and this necessarily rotates the shaft 10, and the rotary motion thereof is imparted by means of the gear-wheels 11 and 9 to the roller 8, on one of the trunnions of which is located said gear-wheel 9, and rotary motion will also be imparted to the roller 25 by reason of the sprocket-chain 27 passing around the sprocket-wheel 26, located upon one of the trunnions of said roller 25. As a result of the rotary motion thus imparted to the two principal rollers the various other rollers will operate, and the endless cords will pass around and between the rollers, as hereinbefore indicated, and when the machine has run a very short time the yielding absorbent surface of the small roller 18 will have completely saturated the absorbent surface of the roller 8 with starch, and the surfaces of the other rollers provided with the elastic absorbent surfaces will be more or less saturated with the starch. The collars, cuffs, and like articles to be starched are placed upon the front table 5, from whence they are fed onto the cords passing over the roller 15ª and by said cords will be carried downwardly between said roller 15ª and the roller 8, and from thence the articles will pass between the rollers 8 and 18, next between the rollers 8 and 19, and finally between the rollers 8 and 25. The operator standing in front of the machine manually engages the article as it emerges from between the rollers 8 and 25 and allows it to again pass around the roller 8, as just described, this action taking place a number of times as required to thoroughly starch said article. As said article passes between the various rollers having the yielding or elastic absorbent surfaces and said surfaces being saturated with starch a certain amount of the starch will be forced into and through the article from each side, and thus said article will be very thoroughly starched. The direction in which the article passes around the roller 8 is indicated by the arrow A, Fig. 3. When the article has been sufficiently starched, it may be passed between the rollers 25 and 29, around the rear side of said roller 29, and over the roller 30, in the direction as indicated by the arrow B, Fig. 3, this operation removing all excess starch from the article, and, finally, the article is deposited upon the rear table 6, from whence it may be taken to the ironing-table.

A starching-machine of my improved construction is very simple, compact, and easily operated, the starch is forced completely through the article from each side thereof, there is no starch left in the corners of the article that is being starched, there are no wrinkles formed in said article, and said article does not need to be wiped after being passed through the machine.

Much time and labor are saved by the use of a machine of my improved construction and very little starch is required to satisfactorily starch a number of articles.

I claim—

A starching-machine, comprising a pair of side frames, a starching-pan carried by said frames, supporting-frames carried by said side frames, a pair of starching-rollers 8 and 25 operating above the said starching-pan, a roller operating in the starching-pan and against the lowermost of the first-mentioned rollers for conducting the starch thereto, a roller 29 above and against the roller 25 for removing all excess starch, a guide-roller 30 operating against the roller 29, a guide-roller 15ª in front of the lowest of said starching-rollers, and a plurality of endless cords passing between the said starching-rollers and around the said guide-rollers, substantially as specified.

In testimony whereof I affix my signature in presence of two witnesses.

WILLIAM W. FINTON.

Witnesses:
 M. P. SMITH,
 JOHN C. HIGDON.